United States Patent
Nagata et al.

(10) Patent No.: US 6,906,990 B2
(45) Date of Patent: Jun. 14, 2005

(54) PHASE-CHANGE OPTICAL DISK AND OPTICAL DISK APPARATUS

(75) Inventors: Masayoshi Nagata, Kanagawa (JP); Takayoshi Chiba, Tokyo (JP); Yasuo Tone, Tokyo (JP); Shigeo Yamaguchi, Kanagawa (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 10/133,820

(22) Filed: Apr. 25, 2002

(65) Prior Publication Data

US 2002/0181377 A1 Dec. 5, 2002

(30) Foreign Application Priority Data

Apr. 27, 2001 (JP) ........................................ 2001-132279

(51) Int. Cl.⁷ ................................................ G11B 7/00

(52) U.S. Cl. ............................... 369/59.25; 369/275.3; 369/47.27

(58) Field of Search .......................... 369/275.3, 47.54, 369/47.27, 59.25, 47.26

(56) References Cited

U.S. PATENT DOCUMENTS 6,757,230 B2 * 6/2004 Noda et al. ............... 369/47.54

* cited by examiner

Primary Examiner—Nabil Hindi
(74) Attorney, Agent, or Firm—Frommer Lawrence & Haug LLP; William S. Frommer (57) ABSTRACT

An optical disk apparatus for a phase-change optical disk detects the boundary between a first region and a second region prior to detecting a synchronization mark. The synchronization mark is detected in accordance with the position of the detected boundary between the first region and the second region. User data is read from a data region in accordance with the detected synchronization mark.

7 Claims, 8 Drawing Sheets

PHASE-CHANGE OPTICAL DISK AND OPTICAL DISK APPARATUS

BACKGROUND OF THE INVENTION

1. Field of the Invention

The present invention relates to phase-change recording-system optical disks (hereinafter referred to as phase-change optical disks) and optical disk apparatuses for reading user data in accordance with a synchronization mark recorded in a recording region by using a random shift.

2. Description of the Related Art

In phase-change optical disks, a mark is recorded by making a laser-spot-section amorphous. In order to prevent deterioration of a medium due to repetitive recording, that is, in order to increase the number of times a recording film can be overwritten, the start position for writing data is randomly shifted. This technology is referred to as "random shift".

In known phase-change optical disks, only a few bytes are prepared for a sync byte as a data sync, which is provided to acquire byte synchronization when reading data, after a gap preceding a recording area in which data is written using a random shift. When the sync byte cannot be detected due to a defect of the optical disk, to dust, or to a scratch on the optical disk, byte synchronization in accordance with the random shift cannot be acquired. It is thus impossible to correctly read the data from the recording area.

When the amount of random shift is increased, a wider detection window for accommodating the amount of shift becomes necessary. This may cause a problem in detecting a synchronization mark when reading data. Generally, however, greater durability can be achieved by increasing the amount of shift.

Specifically, if a known optical disk apparatus cannot detect a sync byte functioning as a data sync prior to a data area in a recording area in a sector, the known optical disk apparatus cannot acquire byte synchronization and thus cannot read data from the data area.

In order to solve the foregoing problem, for example, Japanese Unexamined Patent Application Publication No. 7-262566 proposes a phase-change optical disk in which a synchronous code VFO 3, which is provided prior to a sync byte Sync preceding a data area in a recording area in a sector, is provided including a pattern capable of acquiring byte synchronization, instead of including a single repetitive pattern as in known optical disks.

The known technology described in Japanese Unexamined Patent Application Publication No. 7-262566 forms the synchronous code VFO 3 including the pattern capable of acquiring byte synchronization. As a result, locking of synchronization by a PLL circuit, which is the primary function of the synchronous code VFO 3, may be unlocked, and hence the PLL pull-in effect may not be achieved. Depending on the position, acquisition of byte synchronization is attempted when the PLL pull-in effect is not sufficiently achieved.

When the PLL pull-in effect is not achieved by the synchronous code VFO 3, user data recorded at a position differing according to each channel bit (each recording) using a random shift in a recording area may not be correctly read from the recording area.

SUMMARY OF THE INVENTION

In order to solve the foregoing problems, it is an object of the present invention to provide a phase-change optical disk and an optical disk apparatus for reliably detecting a synchronization mark even when user data is recorded in a recording region using a random shift and for reliably reading the user data in accordance with the detected synchronization mark.

In order to achieve the foregoing objects, according to an aspect of the present invention, there is provided a phase-change optical disk having a plurality of sectors forming tracks which are arranged spirally or concentrically. The plurality of sectors each include a recording region for recording user data using a random shift by which the recording start position of the user data is shifted every time the user data is recorded; and a header region having address information concerning the position of each sector. The recording region includes a first region used for a first purpose; a second region used for a second purpose differing from the first purpose, the second region being continuous from the first region; a data region for recording the user data; and a synchronization mark provided between the second region and the data region, the synchronization mark being detected to acquire synchronization with the data region when reading the user data from the data region. A boundary between the first region and the second region is detected prior to detecting the synchronization mark. The synchronization mark is detected in accordance with the position of the detected boundary between the first region and the second region. The user data is obtained from the data region in accordance with the detected synchronization mark.

Accordingly, when reading the user data from the data region, the boundary between the first region, which precedes the synchronization mark, and the second region is detected prior to detecting the synchronization mark for acquiring synchronization with the data region. In the phase-change optical disk, the synchronization mark is detected in accordance with the detected boundary between the first region and the second region. When the synchronization mark is detected, the user data is read from the data region subsequent to the synchronization mark.

In the phase-change optical disk, even when the user data is recorded in the data region using a random shift, the synchronization mark is reliably detected in accordance with the detected boundary between the first region and the second region.

Thus, the user data can be reliably read from the data region on the phase-change optical disk in accordance with the synchronization mark.

The second region may be formed by a plurality of small regions. When the boundary between the first region and the second region cannot be detected, a boundary between the plurality of small regions may be detected, and the synchronization mark may be detected on the basis of the boundary between the plurality of small regions.

Accordingly, even when the boundary between the first region and the second region cannot be detected, the boundary between the plurality of small regions is detected, and the synchronization mark is correctly detected on the basis of the detected boundary between the plurality of small regions.

The second region may have 80 bytes, and each of the plurality of small regions may have 10 bytes.

In order to achieve the foregoing objects, according to another aspect of the present invention, there is provided an optical disk apparatus for reading at least user data from a phase-change optical disk, the phase-change optical disk having a plurality of sectors forming tracks which are arranged spirally or concentrically. The plurality of sectors each include a recording region for recording user data using a random shift by which the recording start position of the user data is shifted every time the user data is recorded; and a header region having address information concerning the position of each sector. The recording region on the phase-change optical disk includes a first region used for a first purpose; a second region used for a second purpose differing from the first purpose, the second region being continuous from the first region; a data region for recording the user data; and a synchronization mark provided between the second region and the data region, the synchronization mark being detected to acquire synchronization with the data region when reading the user data from the data region. When obtaining the user data from the phase-change optical disk, a boundary between the first region and the second region is detected prior to detecting the synchronization mark. The synchronization mark is detected in accordance with the position of the detected boundary between the first region and the second region. The user data is obtained from the data region in accordance with the detected synchronization mark.

Accordingly, when reading the user data from the data region, the boundary between the first region and the second region is detected prior to detecting the synchronization mark for acquiring synchronization with the data region. Subsequently, the optical disk apparatus detects the synchronization mark in accordance with the detected boundary between the first region and the second region on the phase-change optical disk. When the synchronization mark is detected, the optical disk apparatus reads the user data from the data region subsequent to the synchronization mark.

Even when the user data is recorded in the data region on the phase-change optical disk using a random shift, the optical disk apparatus can reliably detect the synchronization mark in accordance with the detected boundary between the first region and the second region.

Thus, the optical disk apparatus can reliably read the user data from the data region on the phase-change optical disk in accordance with the synchronization mark.

The second region on the phase-change optical disk may be formed by a plurality of small regions. When the boundary between the first region and the second region cannot be detected, a boundary between the plurality of small regions may be detected, and the synchronization mark may be detected on the basis of the boundary between the plurality of small regions.

Accordingly, even when the boundary between the first region and the second region cannot be detected, the boundary between the plurality of small regions in the second region is detected, and the synchronization mark is reliably detected on the basis of the boundary between the plurality of small regions.

When detecting the synchronization mark, the boundary between the first region and the second region or the boundary between the plurality of small regions may be detected, and any one of boundaries among the subsequent small regions may be detected.

Accordingly, even when the boundary between the first region and the second region is erroneously detected at a different position, the subsequent boundary between the plurality of small regions cannot be detected, and hence no synchronization mark can be detected. Thus, the optical disk apparatus detects the synchronization mark only when the optical disk apparatus has detected the boundary between the first region and the second region or the boundary between the plurality of small regions. Accordingly, the synchronization mark can be detected more reliably.

Of the boundary between the first region and the second region and boundaries among the plurality of small regions, the boundary which is difficult to detect may be excluded from detection objects in advance.

Accordingly, the boundary which is difficult to detect can be excluded from detection objects in advance. Thus, the boundary between the first region and the second region or the boundary between the plurality of small regions can be detected more reliably.

As described above, according to the present invention, it is possible to provide a phase-change optical disk and an optical disk apparatus for reliably detecting a synchronization mark and for reliably reading user data even when the user data is recorded in a recording region using a random shift.

DESCRIPTION OF THE PREFERRED EMBODIMENTS

The present invention will become clear from the following description of the preferred embodiments with reference to the accompanying drawings.

Since the embodiments described below are preferred examples of the present invention, various technically preferable restrictions have been added. However, the scope of the present invention is not limited to these embodiments unless otherwise indicated in the following description as limiting the present invention.

First Embodiment

Figure 1:
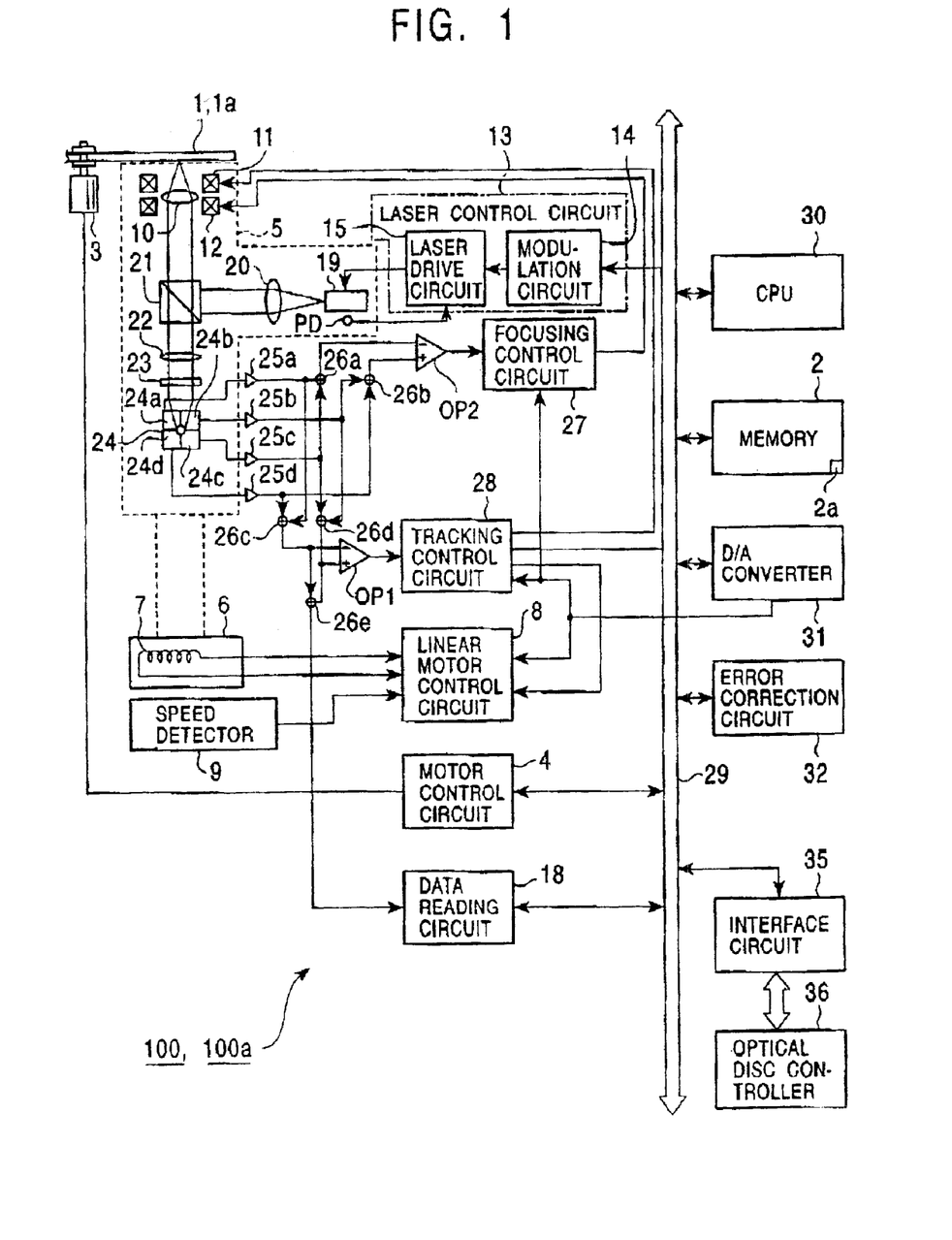
FIG. 1 is a block diagram showing the configuration of an example of an optical disk apparatus according to a first embodiment of the present invention.
Figure 2:
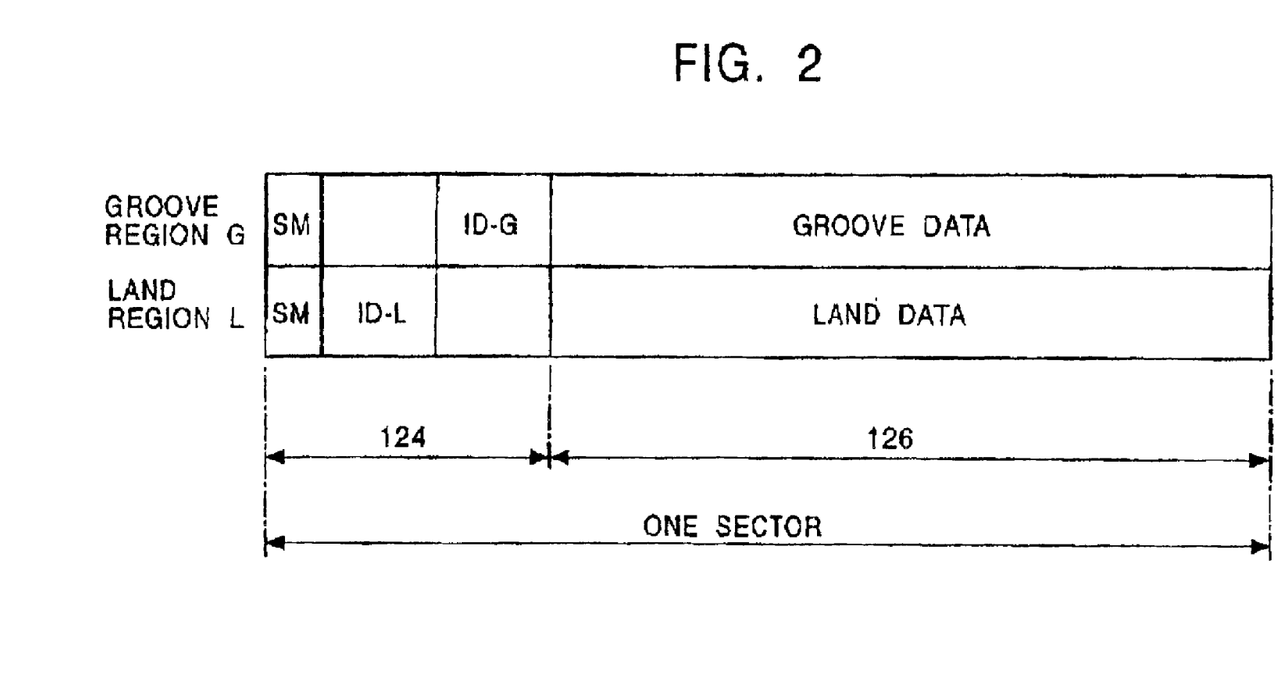
FIG. 2 illustrates an example of a sector format of an optical disk shown in FIG. 1.

FIG. 1 shows the configuration of an example of an optical disk apparatus 100 according to a first embodiment of the present invention. FIG. 2 illustrates an example of a sector format of an optical disk 1 shown in FIG. 1.

The optical disk apparatus 100 has a function for writing data to, for example, the phase-change optical disk 1 using condensed light or a function for reading recorded data. The optical disk 1 is manufactured by coating the surface of a disk-shaped substrate formed of glass or plastic with a metal-coated layer, such as layer coated with tellurium or bismuth, in the shape of a donut.

In the phase-change recording system, the metal-coated layer formed in the Interior of the optical disk 1 is irradiated with a laser beam. At a high temperature of approximately 600° C., the metal-coated layer changes to an amorphous (non-crystal)-molecular state in which the molecules are not organized. At approximately 400° C., the molecular state of the metal-coated layer is oriented and hence the metal-coated layer changes to a crystal state. The phase-change recording system distinctively records user data by switching between the two states, namely, the amorphous state and the crystal state.

In the phase-change recording system, when reading the user data, a recording layer is irradiated with a weak laser beam, and the intensity of reflected light is detected, thus discriminating between the crystal state and the amorphous state. Specifically, a crystal portion of the metal-coated layer has a higher reflectivity than that of an amorphous portion of the metal-coated layer.

The optical disk 1 is disk-shaped. The optical disk 1 is divided into a plurality of zones containing a plurality of tracks in the radial direction. The frequency value of a clock signal for each zone differs from zone to zone. In other words, the frequency value increases from the inner zone to the outer zone. For example, the number of sectors in one track is different for each zone The relationship between a division value corresponding to the frequency value of the clock signal for each zone and the number of sectors in one track is recorded in a table 2a of a memory 2.

In each track in each zone of the optical disk 1, a header in which an address or the like is recorded is pre-formatted according to each sector. Referring to FIG. 2, one sector has a pre-formatted area 124 as the header and a recording area 126 for recording user data. Sectors are provided in, for example, a groove region G and a land region L of the optical disk 1. In the following description, data recorded in each sector is 1-7-modulated data. The 1-7-modulated data is in a format in which one to seven 0's are inserted between 1 and 1.

The pre-formatted area 124 is, as shown in FIG. 2, an area for recording predetermined data when the optical disk 1 is manufactured. The pre-formatted area 124 of the groove region G has a sector mark SM and an ID field ID-G, and the pre-formatted area 124 of the land region L has a sector mark SM and an ID field ID-L. The ID fields ID-G and ID-L each have at least one synchronous code, one address mark, one address, and one postamble (not shown).

In the sector mark SM, a special pattern which is provided for detecting the start of the sector without depending on PLL and which indicates the start of the sector is recorded. The sector mark SM is formed by embossed data of different lengths, which are continuous to a lead-in area to at least one synchronous code. In each synchronous code area, a continuous data pattern (synchronous code) for channel bit synchronization is recorded.

In the address mark area, a special pattern indicating the start of address is recorded. In the address, for example, a sector number and an error-correction code (CRC: Cyclic Redundancy Check) are recorded. The postamble is used when the error-correction code in the address ID exceeds a predetermined number of bytes.

Figure 4:
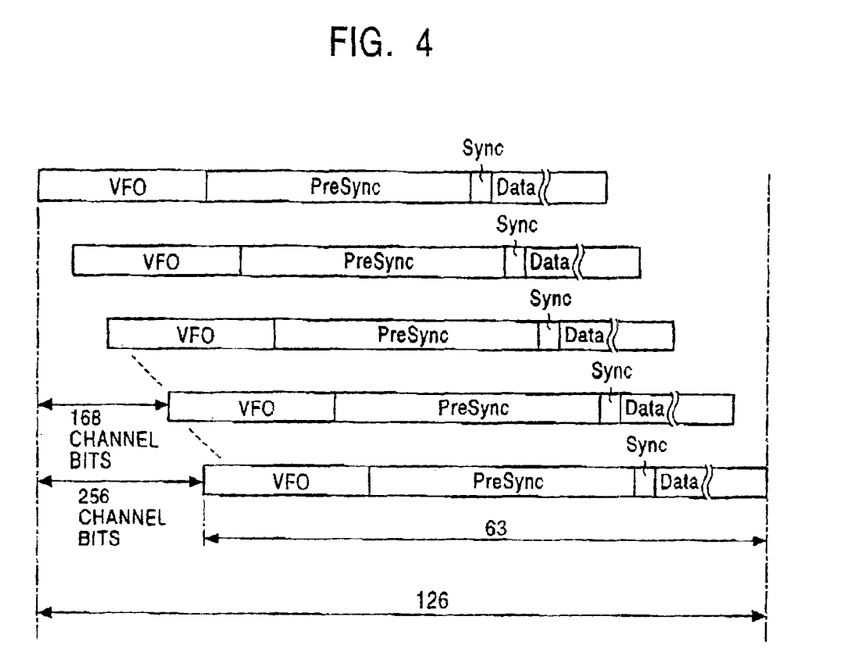
FIG. 4 is a timing chart showing an example of a random shift.

Referring to FIG. 4, the recording area 126 includes a succession of a synchronous code VFO, a pre sync PreSync of, for example, 80 bytes, a data mark Sync, and a data region Data.

At the left of the synchronous code VFO, a gap is randomly set within the range of 0 to 255 channel bit length in one channel bit unit. Accordingly, subsequent to the gap, recorded data 63 from the synchronous code VFO onward Is recorded in the recording area 126 while being randomly shifted by one channel bit length within the range of 256 channel bit length.

In the synchronous code VFO (first region), a synchronous code (first pattern) formed by a series of recording waveforms of the shortest length for pulling in a self-clock frequency (PLL: Phase Locked Loop) for channel bit synchronization is recorded. For example, if the shortest recording waveform length is indicated by a mark instead of a space, the shortest recording waveform length is referred to as a "shortest mark length".

A specific example of the synchronous code is, for example, "101010101 . . . 101" since 1-7 modulation is employed in the first embodiment. In the pre sync PreSync (second region), a data pattern for performing drive adjustment Is recorded.

In the data mark Sync, a special pattern indicating the start of a data region is recorded. In the data region Data, user data, ECC (Error Correction Code), and CRC are recorded. The postamble PA succeeds the data region Data and indicates the end of the data region Data.

A buffer area (not shown) is provided subsequent to the data region Data. The buffer area is an area for rotational variation margin for the optical disk. In accordance with a shift in the gap, the buffer area is changed within the range of predetermined channel bit length, such as 256 channel bit length.

The electrical configuration of the optical disk apparatus 100 will now be described.

The optical disk 1 shown in FIG. 1 is rotated at, for example, a predetermined speed by a motor 3. The motor 3 is controlled by a motor control circuit 4. Information is written to and read from the optical disk 1 by an optical head 5. The optical head 5 is fixed to a drive coil 7 forming a movable section of a linear motor 6. The drive coil 7 is connected to a linear motor control circuit 8.

A speed detector 9 is connected to the linear motor control circuit 8. The speed detector 9 transmits a speed signal of the optical head 5 to the linear motor control circuit 8. A permanent magnet (not shown) is provided on a fixed section of the linear motor 6. By exciting the drive coil 7 by the linear motor control circuit 8, the optical head 5 moves in the radial direction of the optical disk 1.

On the optical head 5, an objective lens 10 is supported by wire or a leaf spring (not shown). The objective lens 10 is movable by a drive coil 12 in the focusing direction (the optical axis direction of the lens) and is movable by a drive coil 11 in the tracking direction (the direction orthogonal to the optical axis of the lens).

A semiconductor laser oscillator 9 is driven by a laser control circuit 13, thus generating a laser beam. The laser control circuit 13 is formed by a modulation circuit 14 and a laser drive circuit 15. The laser control circuit 13 operates in synchronization with a recording clock signal from a PLL circuit (not shown). The PLL circuit divides a reference clock signal from an oscillator (not shown) into frequencies corresponding to recording positions on the optical disk 1, thus generating recording clock signals.

The modulation circuit 14 modulates recording data supplied from an error correction circuit 32, which will be described hereinafter, into a signal suitable for recording, such as 1-7-modulated data. The laser drive circuit 15 drives a semiconductor laser oscillator (or an argon neon laser oscillator) 19 in the optical head 5 using the 1-7-modulated data, which is modulated by the modulation circuit 14.

The optical disk 1 is irradiated with a laser beam generated by the semiconductor laser oscillator (or the argon neon laser oscillator) 19, which is driven by the laser drive circuit 15 of the laser control circuit 13, through a collimator lens 20, a half prism 21, and the objective lens 10. Light reflected from the optical disk 1 is directed to an optical detector 24 through a condenser lens 22 and a cylindrical lens 23.

The optical detector 24 is formed by four parts, namely, optical detector cells 24a, 24b, 24c, and 24d. An output signal of the optical detector cell 24a of the optical detector 24 is supplied to a first end of an adder 26a through an amplifier 25a. An output signal of the optical detector cell 24b is supplied to a first end of an adder 26b through an amplifier 25b. An output signal of the optical detector cell 24c is supplied to a second end of the adder 26a through an amplifier 25c. An output signal of the optical detector cell 24d is supplied to a second end of the adder 26b through an amplifier 25d.

An output signal of the optical detector cell 24a of the optical detector 24 is supplied to a first end of an adder 26c through the amplifier 25a. An output signal of the optical detector cell 24b is supplied to a first end of an adder 26d through the amplifier 25b. An output signal of the optical detector cell 24c is supplied to a second end of the adder 26d through the amplifier 25c. An output signal of the optical detector cell 24d is supplied to a second end of the adder 26c through the amplifier 25d.

An output signal of the adder 26a is supplied to an inverting input end of a differential amplifier OP2. An output signal of the adder 26b is supplied to a non-inverting input end of the differential amplifier OP2. Accordingly, the differential amplifier OP2 supplies a signal concerning a focus point in accordance with the difference between the adders 26a and 26b to a focusing control circuit 27. An output signal of the focusing control circuit 27 is supplied to the focusing drive coil 12, and hence the laser beam is controlled to be always in exact focus on the optical disk 1.

An output signal of the adder 26c is supplied to an inverting input end of a differential amplifier OP1. An output signal of the adder 26d is supplied to a non-inverting input end of the differential amplifier OP1. Accordingly, the differential amplifier OP1 supplies a track difference signal in accordance with the difference between the adders 26c and 26d to a tracking control circuit 28. The tracking control circuit 28 generates a track drive signal in accordance with the track difference signal supplied from the differential amplifier OP1.

The track drive signal output from the tracking control circuit 28 is supplied to the drive coil 11 in the tracking direction. Also, the track difference signal used by the tracking control circuit 28 is supplied to the linear motor control circuit 8.

A sum signal of the outputs of the optical detector cells 24a to 24d of the optical detector 24 while focusing and tracking are performed as described above, that is, a signal generated by an adder 26e by adding output signals of the adders 26c and 26d, reflects a change in reflectivity from a pit (recorded information) formed on a track. The signal is supplied to a data reading circuit 18. The data reading circuit 18 reads the recorded data.

The data read by the data reading circuit 18 is output to the error correction circuit 32 through a bus 29. The error correction circuit 32 corrects an error in accordance with an error correction code ECC in the read data, adds an error correction code ECC to recording data supplied from an interface circuit 35, and outputs the data to the memory 2.

The read data, which has been subjected to error correction by the error correction circuit 32, is output to an optical disk controller 36 as an external apparatus through the bus 29 and the interface circuit 35. The optical disk controller 36 supplies recording data to the error correction circuit 32 through the interface circuit 35 and the bus 29.

When the objective lens 10 is moved by the tracking control circuit 28, the linear motor control circuit 8 moves the linear motor 6, that is, the optical head 5, so that the objective lens 10 can be placed at a position near the center position in the optical head 5.

In the optical disk apparatus 100, a D/A converter 31 is provided so that information can be exchanged among the focusing control circuit 27, the tracking control circuit 28, the linear motor control circuit 8, and a CPU (Central Processing Unit) 30 for controlling the entire optical disk apparatus 100.

The motor control circuit 4, the linear motor control circuit 8, the laser control circuit 15, the data reading circuit 18, the focusing control circuit 27, the tracking control circuit 28, and the error correction circuit 32 are controlled by the CPU 30 through the bus 29. The CPU 30 performs a predetermined operation In accordance with a program recorded in the memory 2.

Figure 3:
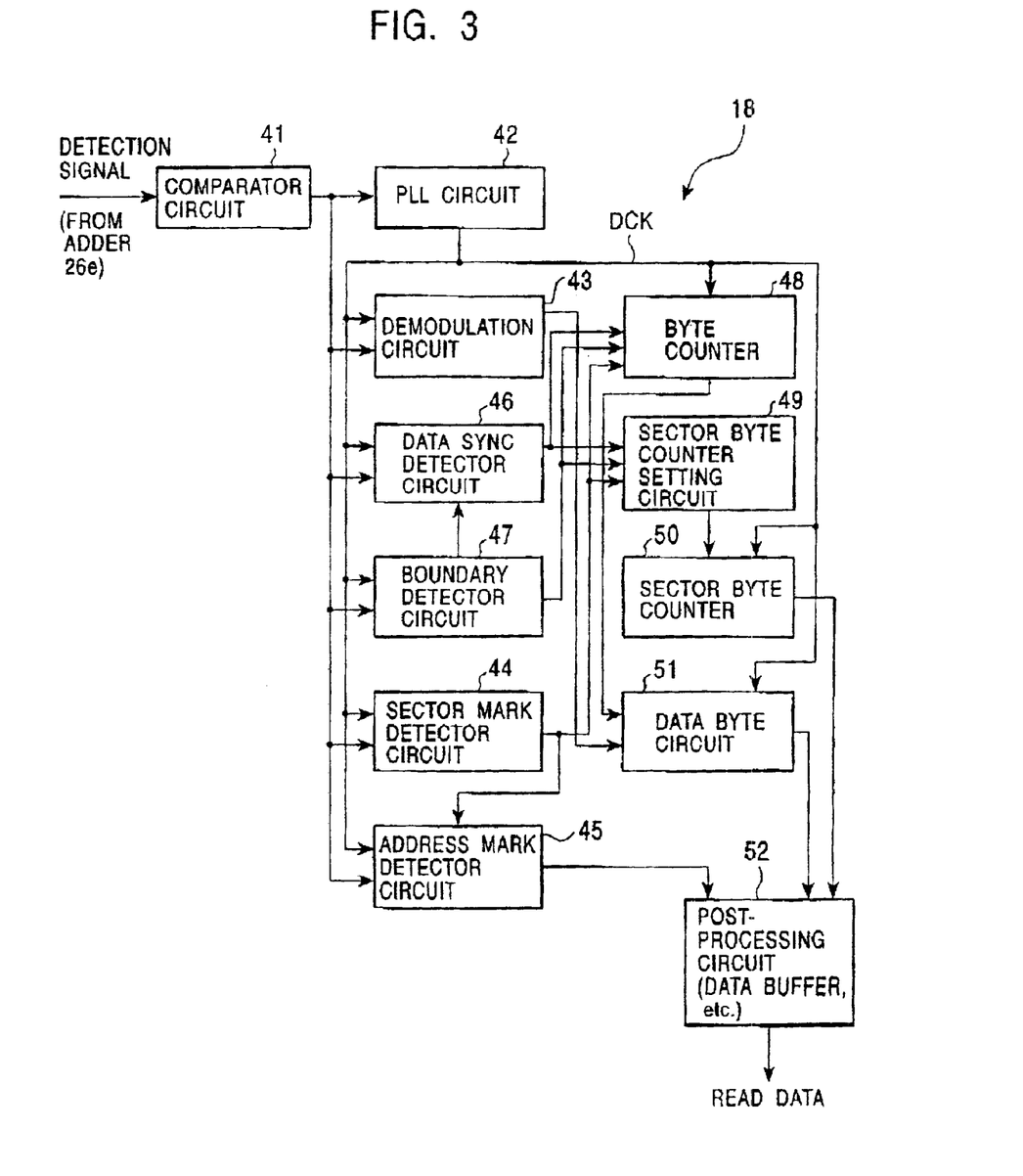
FIG. 3 is a block diagram showing the electrical configuration of an example of a data reading circuit shown in FIG. 1.

FIG. 3 is a block diagram of the electric configuration of the data reading circuit 18 shown in FIG. 1.

The data reading circuit 18 contains a comparator circuit 41, a PLL circuit 42, a demodulation circuit 43, a sector mark detector circuit 44, an address mark detector circuit 45, a data sync (SYN) detector circuit 46, a byte counter 48, a sector byte counter setting circuit 49, a sector byte counter 50, a data byte circuit 51, a post-processing circuit 52, and a boundary detector circuit 47, which is a feature of the first embodiment. The boundary detector circuit 47 will be described in detail hereinafter.

The comparator circuit 41 digitizes the sum signal from the adder 26e and outputs channel bit data. The channel bit data CBD from the comparator circuit 41 is output to the PLL circuit 42, the demodulation circuit 43, the sector mark detector circuit 44, the address mark detector circuit 45, the data sync (SYN) detector circuit 46, and the boundary detector circuit 47.

In reading, the PLL circuit 42 generates a reading clock signal corresponding to a control signal from the CPU 30 and to the read synchronous code. The clock signal from the PLL circuit 42 is output to the demodulation circuit 43, the sector mark detector circuit 44, the address mark detector circuit 45, the data sync detector circuit 46, the boundary detector circuit 47, the byte counter 48, the sector byte counter 50, and the data byte circuit 51.

The demodulation circuit 43 is a circuit for demodulating, that is, reading, the channel bit data from the comparator circuit 41 in accordance with the clock signal from the PLL circuit 42 by performing inverse 1-7code conversion. The demodulated signal from the demodulation circuit 43 is supplied to the data byte circuit 51.

The sector mark detector circuit 44 detects the sector mark SM in accordance with the channel bit data from the comparator circuit 41 and the clock signal from the PLL circuit 42. The sector mark detector circuit 44 is formed by a pattern detector circuit containing a register and a comparator (not shown). A sector mark detection signal from the sector mark detector circuit 44 is supplied to the address mark detector circuit 45, the byte counter 48, and the sector byte counter setting circuit 49.

After the sector mark SM has been detected, the address mark detector circuit 45 detects the address mark in accordance with the channel bit data from the comparator circuit 41 and the clock signal from the PLL circuit 42. The address mark detector circuit 45 is formed by, for example, a register and a comparator (not shown). An address mark detection signal from the address mark detector circuit 45 is supplied to the post-processing circuit 52.

The data sync detector circuit 46 detects the data mark Sync in accordance with the channel bit data from the comparator circuit 41 and the clock signal from the PLL circuit 42. The data sync detector circuit 46 is formed by a register and a comparator (not shown). A data sync detection signal from the data sync detector circuit 46 is supplied to the byte counter 48 and the sector byte counter setting circuit 49.

Figure 5:
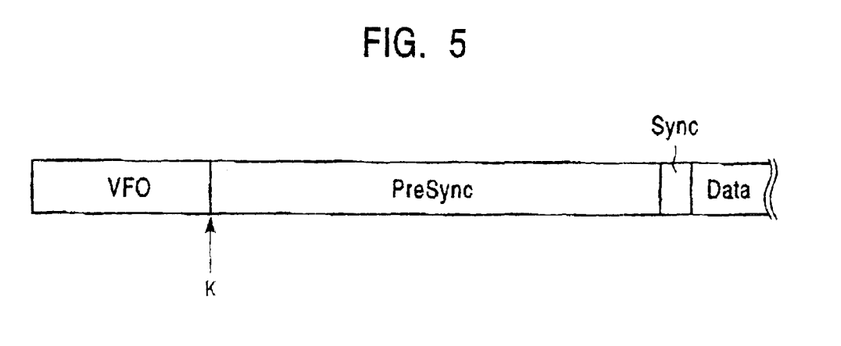
FIG. 5 is an enlarged view of synchronous code and the like shown in FIG. 4.

The boundary detector circuit 47, which is a feature of the first embodiment, has a function for detecting a boundary K between the synchronous code VFO and the pre sync PreSync shown in FIG. 5 in accordance with the channel bit data from the comparator circuit 41 and the clock signal from the PLL circuit 42. A reading-synchronization-signal detection signal from the boundary detector circuit 47 shown in FIG. 3 is supplied to the byte counter 48, the data sync detector circuit 46, and the sector byte counter setting circuit 49. The details of the function of the boundary detector circuit 47 will be described in a description of the operation of the optical disk apparatus 100.

The byte counter 48 counts the clock signals from the PLL circuit 42 in synchronization with the detection signal from the sector mark detector circuit 44, the data sync detector circuit 46, or the boundary detector circuit 47, and outputs a byte detection signal (corresponding to the byte boundary) every predetermined number of bytes. The byte detection signal from the byte counter 48 is supplied to the sector byte counter 50 and the data byte circuit 51.

When the detection signal is supplied from the sector mark detector circuit 44, the data sync detector circuit 46, or the boundary detector circuit 47, the sector byte counter setting circuit 49 sets the corresponding number of bytes to the sector byte counter 50 so that the sector byte counter 50 performs a sector byte counting operation in synchronization with the read data.

The sector byte counter 50 counts the ordinal byte in the sector format in accordance with the byte detection signal from the byte counter 48, the clock signal from the PLL circuit 42, and the signal from the sector byte counter setting circuit 49.

The data byte circuit 51 has a function for changing the demodulated signal from the demodulation circuit 43 into data in units of predetermined number of bytes in accordance with the byte detection signal from the byte counter 48 and the clock signal from the PLL circuit 42 and for supplying the data to the post-processing circuit 52. The data byte circuit 51 is formed by, for example, a serial-parallel conversion element (not shown).

The post-processing circuit 52 stores the sector number and the data in byte unit from the data byte circuit 51 in an internal data buffer in accordance with the detection signal from the address mark detector circuit 45 and the sector byte number from the sector byte counter 50. The post-processing circuit 52 is formed by, for example, a data buffer (not shown).

Specifically, a channel bit data raw from the comparator circuit 41 is input to the sector mark detector circuit 44 and the address mark detector circuit 45. When the sector mark SM is detected by the sector mark detector circuit 44, predetermined values corresponding to the time the sector mark SM is detected are set to the byte counter 48 and the sector byte counter 50, respectively. When the address mark is detected by the address mark detector circuit 45, predetermined values, corresponding to the time the address mark is detected, are set to the byte counter 48 and the sector byte counter 50, respectively.

The values set to the sector byte counter 50 differ between the time the sector mark SM is detected and the time the address mark is detected. These values are generated by the sector byte counter setting circuit 49 in accordance with the sector mark SM detection signal and the address mark detection signal and are input to the sector byte counter 50.

Since recording of data to the phase-change optical disk 1 employs a random shift, the recorded data 63 shown in FIG. 4 cannot be read in accordance with the correct timing based on the timing of the detected sector mark SM and the timing of the address mark, such as the ID field ID-G, shown in FIG. 2.

When the data mark Sync is detected by the data sync detector circuit 46 shown in FIG. 3, predetermined values, corresponding to the time the boundary K between the synchronous code VFO and the pre sync PreSync (shown in FIG. 5) is detected and to the time the data mark Sync (shown in FIG. 5) is detected, are set to the byte counter 48 and the sector byte counter 50.

The values set to the sector byte counter 50 differ between the time the boundary K between the synchronous code VFO and the pre sync PreSync (shown in FIG. 5) is detected and the time the data mark Sync (shown in FIG. 5) is detected. These values set to the sector byte counter 50 are generated by the sector byte counter setting circuit 49 in accordance with the detection signal of the boundary K between the synchronous code VFO and the pre sync PreSync and the detection signal of the data mark Sync and are input to the sector byte counter so. The recorded data 63 in the recording area 126 of the sector shown in FIG. 4 is read in accordance with the detected timing.

The optical disk 1 and the optical disk apparatus 100 are structured as described above. Referring to FIGS. 1 and 2, the reading operation of the optical disk apparatus 1 will now be described.

FIG. 4 illustrates an example of a shift in recorded data which is recorded using a random shift.

Figure 6:
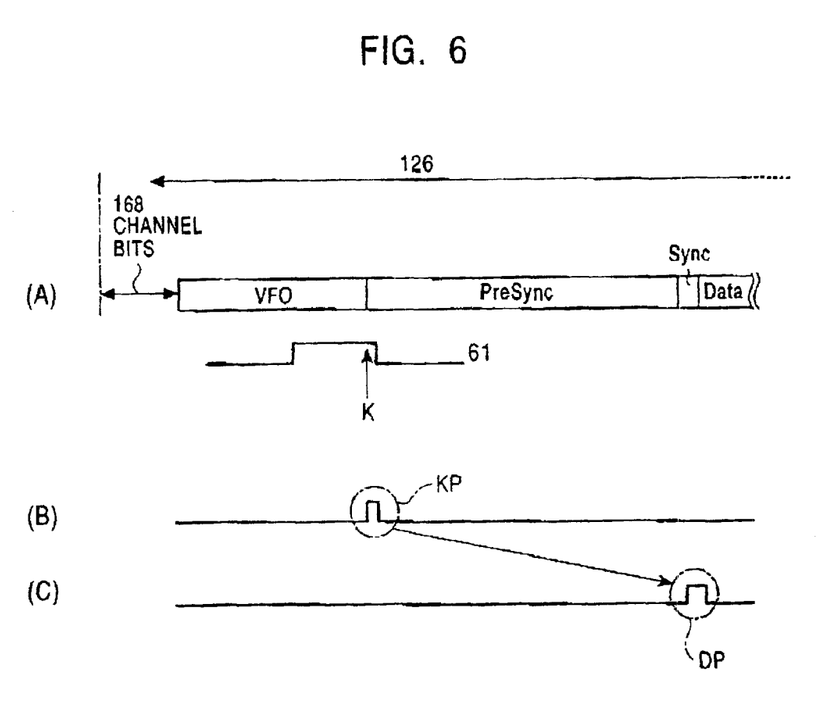
FIG. 6 illustrates an example of a shift in a recorded data which is recorded using a random shift.

FIG. 5 illustrates an enlarged view of the synchronous code VFO and the like shown in FIG. 4. Portions (A) to (C) in FIG. 6 illustrate detection of the boundary K by placing a detection window 61 at the boundary K between the synchronous code VFO and the pre sync PreSync.

As described above, user data is recorded in the optical disk 1 using a random shift, as shown in FIG. 4, that is, by shifting the user data within the recording area 126 every time the user data is recorded. Specifically, the recorded data 63, which includes the data region Data for recording the user data and the synchronous code VFO, is shifted in units of one channel bit within, for example, 256 channel bits.

When the optical disk apparatus 100 is reading data, the track number and the sector number are supplied from the optical disk controller 36 to the CPU 30 through the interface circuit 35 and the bus 29, shown in FIG. 1.

The CPU 30 determines the zone in accordance with the track number, reads a division value corresponding to a frequency value of a clock signal corresponding to the zone from the table 2a, and outputs a control signal corresponding to the division value to the PLL circuit 42, shown in FIG. 3. Thus, the PLL circuit 42 generates a clock signal and outputs the clock signal to each block.

The CPU 30 controls the linear motor control circuit 8 and the tracking control circuit 28 in accordance with the track number. Accordingly, the laser beam by the optical head 5 moves to the track corresponding to the track number. In the following description, this operation is referred to as "access processing". In this state, a read signal corresponding to the pre-formatted data as the header on the track is digitized by the comparator circuit 41 shown in FIG. 3, and the digitized data is supplied to the sector mark detector circuit 44. When the sector mark SM is detected by the sector mark detector circuit 44, the optical disk apparatus 100 can specify the sector position.

When the sector mark SM is detected, the ID field ID-G and the ID-field ID-L in the pre-formatted area 124 are detected. Subsequently, the optical disk apparatus 100 obtains the recorded data 63, shown in FIG. 4, which is recorded using a random shift, in accordance with the ID-field ID-G in the pre-formatted area 124 and the like in the following manner.

The synchronous code VFO is recorded using a random shift by which the recording position of the synchronous code VFO is shifted. For example, the recording position is shifted for 168 channel bits.

Prior to the user data recorded in the data region Data, the data mark Sync is provided. When reading the user data form the data region Data, synchronization is acquired by the data mark Sync. Thus, it is important to reliably detect the data mark Sync in order that the user data can be reliably read from the data region Data.

In a known optical disk apparatus, as described above, when user data is recorded using a random shift, the PLL pull-in effect may not be reliably achieved by the synchronous code VFO. In the optical disk apparatus 100 of the first embodiment, instead of directly detecting the data mark Sync, the boundary K between the synchronous code VFO (first region) and the pre sync PreSync (second region), such as that shown in FIG. 5, is detected prior to detecting the data mark Sync.

Specifically, as shown by portion (A) of FIG. 6, the detection window 61 is placed at the boundary K between the synchronous code VFO and the pre sync PreSync. In a range in which, for example, "high" is detected by the detection window 61, it is determined whether or not the boundary K between the synchronous code VFO and the pre sync PreSync exists. The detection window 61 is a function of the boundary detector circuit 47 shown in FIG. 3. When the boundary K is detected by the detection window 61, as shown by portion (B) of FIG. 6, a boundary detection pulse KP is generated.

When the boundary K is detected by the detection window 61, the data mark Sync is detected in accordance with the boundary detection pulse KP. As a result, a data mark detection pulse DP, shown by portion (C) of FIG. 6, is generated, and the data mark Sync is thus detected.

Accordingly, the optical disk apparatus 100 can detect the boundary K in advance. Thus, the width of the detection window 61 for detecting the data mark Sync can be reduced to a minimum. The optical disk apparatus 100 can detect the data mark Sync in a more reliable manner than directly detecting the data mark Sync.

At last, the optical disk apparatus 100 can read the user data from the data region Data In accordance with the reliably detected data mark Sync.

According to the first embodiment of the present invention, even when reading user data, which is written in the recording area 126 by randomly shifting the writing start position thereof in the recording area 126, the data mark Sync indicating the head of the user data can be reliably detected. Since the data mark Sync can be reliably detected, the optical disk apparatus 100 can reliably read the user data from the data region Data.

Second Embodiment

Since an optical disk apparatus 100a and an optical disk la of a second embodiment are substantially the same as those of the first embodiment, which are shown in FIGS. 1 to 6, the same reference numerals as those shown in FIGS. 1 to 6 are given to the same components, and repetitive descriptions of common portions are omitted. Mainly, portions that are different are described.

Figure 7:
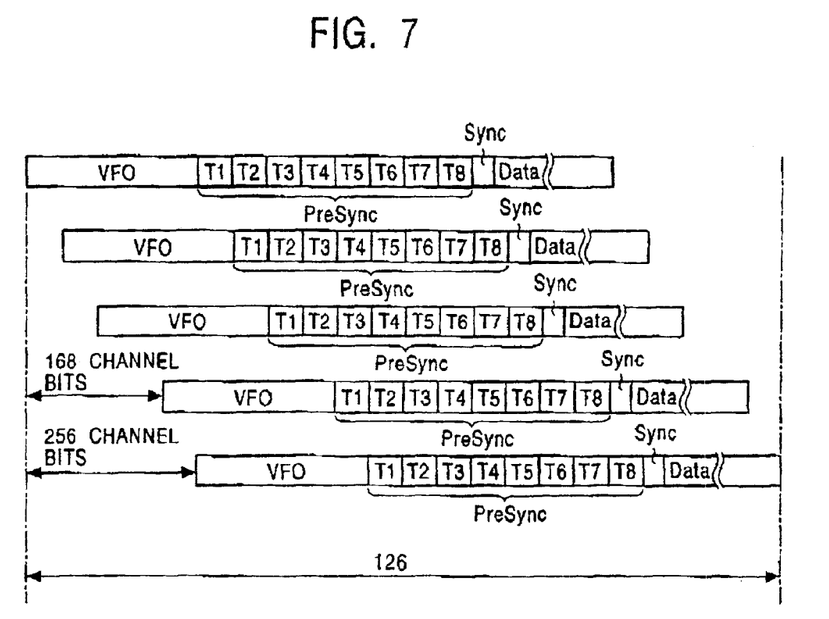
FIG. 7 is a timing chart showing an example of a random shift.
Figure 8:
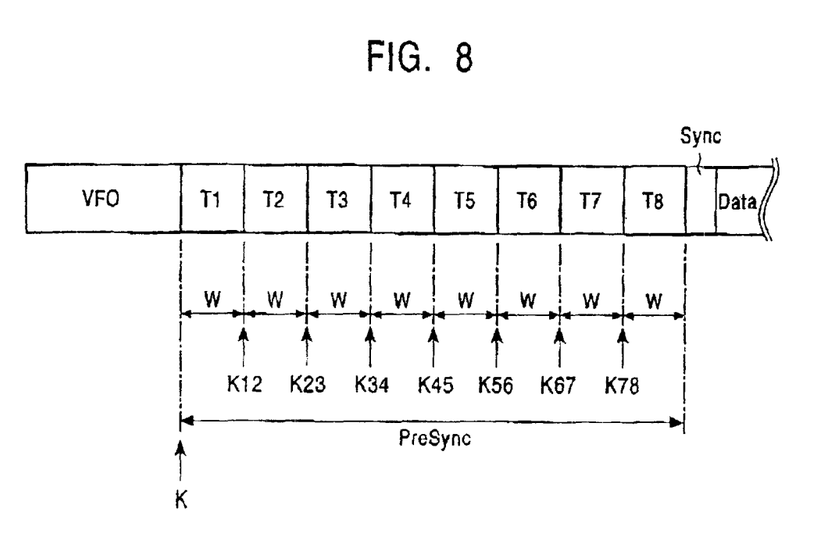
FIG. 8 is an enlarged view of the synchronous code and the like shown in FIG. 4.
Figure 9:
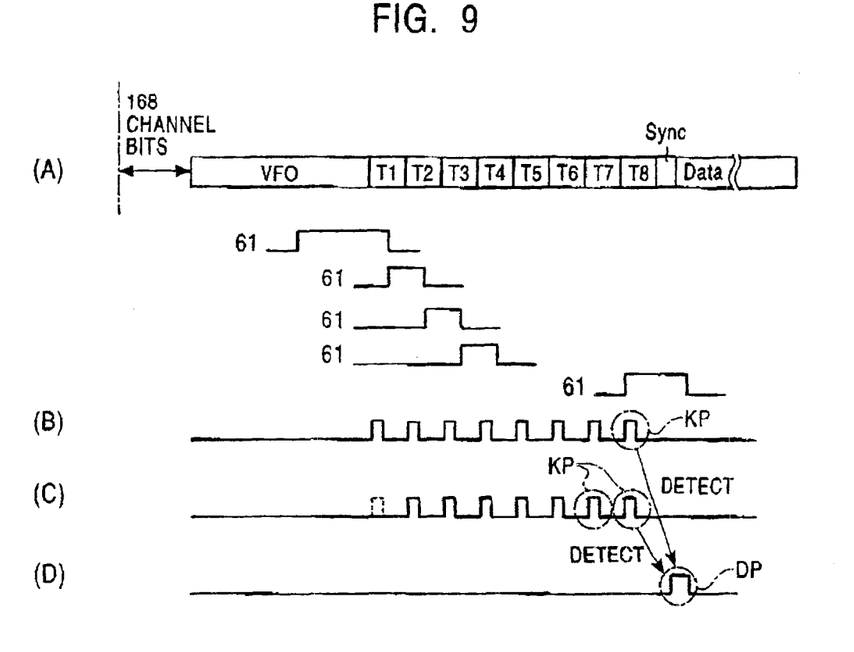
FIG. 9 illustrates an example in which a detection window is placed at the boundary between the synchronous code and a pre sync and the boundary is thereby detected.

FIG. 7 is a timing chart showing an example of a random shift. FIG. 8 is an enlarged view of the synchronous code VFO and the like shown in FIG. 7. FIG. 9 illustrates an example in which the detection window 61 is placed at the boundary K between the synchronous code VFO and the pre sync PreSync and the boundary K is thus detected.

The optical disk 1 according to the second embodiment differs from the optical disk 1 according to the first embodiment, shown in FIGS. 4 to 6, in that the pre sync PreSync is divided into, for example, eight small 10-byte regions T1 to T8, as shown in FIGS. 7 to 9. In other words, the pre sync PreSync (second region) show in FIG. 8 is formed by the small regions T1 to T8 (a plurality of regions). The boundaries among the small regions T1 to T8 (a plurality of boundaries among the small regions) are represented as boundaries K12 to K78, respectively.

In the optical disk apparatus 100 according to the first embodiment, the boundary detector circuit 47 shown in FIG. 3 only detects the boundary K between the synchronous code VFO and the pre sync PreSync prior to detecting the data mark Sync shown in FIG. 6. In the optical disk apparatus 100a according to the second embodiment, not only the boundary K between the synchronous code VFO and the pre sync PreSync shown in FIG. 8 is detected, but also any one of or any one combination of the boundaries K12 and K78 is detected.

When arranged as described above, even if the optical disk apparatus 100a cannot detect the boundary K between the synchronous code VFO and the pre sync PreSync, the optical disk apparatus 100a can detect any one of or any one combination of the boundaries K12 to K78 among the small regions T1 to T8. Starting from the detected position, the optical disk apparatus 100a can determine the data mark Sync (synchronization mark). Thus, the optical disk apparatus 100a can reliably read user data in accordance with the detected data mark Sync. If the optical disk apparatus 100a has detected the boundary K, the optical disk apparatus 100a can correct the remaining distance to the data mark Sync using any one of the boundaries K12 to K78. In other words, the optical disk apparatus 100a can generate the detection window (the detection window 61 described below) for detecting the data mark Sync at a correct position.

The operation of the optical disk apparatus 100a will now be briefly described.

Specifically, as shown by portion (B) of FIG. 9, the optical disk apparatus 100a detects the boundaries K, K12, ..., K78 and generates corresponding boundary detection pulses KP. In accordance with the detection pulse KP, of the detected boundaries K, K12, ..., K78, which is closest to the data mark Sync, the optical disk apparatus 100a detects the data mark Sync and generates a data mark detection pulse DP. The data mark Sync is detected in accordance with the detection pulse KP that is closest to the data mark Sync, because the data mark Sync can be reliably detected when the distance from the boundary K78 to the data mark Sync is short.

As shown by portion (C) of FIG. 9, the optical disk apparatus 100a may detect the data mark Sync in accordance with a combination of a plurality of boundary detection pulses KP. When the optical disk apparatus 100a erroneously detects a boundary, the optical disk apparatus 100a cannot detect the subsequent boundary even if the optical disk apparatus 100a attempts to detect it. As a result, there is no possibility of detecting the data mark Sync in accordance with the incorrect boundary. Thus, the optical disk apparatus 100a can detect the data mark Sync and read the user data from the data region Data in a more reliable manner.

When the optical disk apparatus 100a cannot detect the boundary K between the synchronous code VFO and the pre sync PreSync, which is to be detected in the first place, the optical disk apparatus 100a may detect any one or any one combination of the boundaries K12 o K78 among the small regions. Accordingly, even if the optical disk apparatus 100a cannot detect the boundary K between the synchronous code VFO and the pre sync PreSync, which is to be detected in the first place, the optical disk apparatus 100a can detect any one of or any one combination of the boundaries K12 to K78 among the small regions, which is detected in the second place. Accordingly, the optical disk apparatus 100 can reliably detect the data mark Sync.

It is preferable that the optical disk apparatus 100a detect a boundary as close to the data mark Sync as possible. When a boundary closer to the data mark Sync is detected, the user data can be read from the data region Data more correctly.

According to the second embodiment of the present invention, substantially the same advantages as those of the first embodiment can be achieved. Also, even when it becomes more difficult to detect the boundary K between the synchronous code VFO and the pre sync PreSync shown in FIG. 8, there is a plurality of chances to detect the other boundaries, such as the boundary K12. According to the second embodiment of the present invention, the optical disk apparatus 100a can reliably detect the data mark Sync and can reliably read the user data.

The present invention is not limited to the foregoing embodiments.

In the second embodiment, there is a plurality of chances to detect the boundaries including the boundary K, and the optical disk apparatus 100a detects these boundaries including the boundary K. Since some of these boundaries are difficult to detect, the boundary detector circuit 47 shown in FIG. 3 can be set in advance not to detect these less detectable boundaries. Thus, the optical disk apparatus 100a can detect the boundary more reliably. Since the optical disk apparatus 100a does not have to detect unnecessary boundaries, the optical disk apparatus 100a can detect the boundary quickly.

Each of the components in the foregoing embodiments can be partially omitted, and the components can be arbitrarily combined in a manner differing from the foregoing embodiments.

What is claimed is:

1. A phase-change optical disk having a plurality of sectors forming tracks which are arranged spirally or concentrically, the plurality of sectors each comprising:
   a recording region for recording user data by randomly shifting the recording start position of the user data every time the user data is recorded; and
   a header region having address information concerning the position of each sector;
   the recording region comprising:
      a first region used for a first purpose;
      a second region used for a second purpose differing from the first purpose, the second region being continuous from the first region;
      a data region for recording the user data; and
      a synchronization mark provided between the second region and the data region, the synchronization mark being detected to acquire synchronization with the data region when reading the user data from the data region,
   wherein a boundary between the first region and the second region is detected prior to detecting the synchronization mark,
   the synchronization mark is detected in accordance with the position of the detected boundary between the first region and the second region, and
   the user data is obtained from the data region in accordance with the detected synchronization mark.

2. A phase-change optical disk according to claim 1, wherein the second region is formed by a plurality of small regions, and
   when the boundary between the first region and the second region cannot be detected, a boundary between the plurality of small regions is detected, and the synchronization mark is detected on the basis of the boundary between the plurality of small regions.

3. A phase-change optical disk according to claim 2, wherein the second region has 80 bytes, and each of the plurality of small regions has 10 bytes.

4. An optical disk apparatus for reading at least user data from a phase-change optical disk, the phase-change optical disk having a plurality of sectors forming tracks which are arranged spirally or concentrically, the plurality of sectors each comprising:
   a recording region for recording user data by randomly shifting the recording start position of the user data every time the user data is recorded; and
   a header region having address information concerning the position of each sector;
      the recording region on the phases-change optical disk comprising:
         a first region used for a first purpose;
         a second region used for a second purpose differing from the first purpose, the second region being continuous from the first region;
         a data region for recording the user data; and
         a synchronization mark provided between the second region and the data region, the synchronization mark being detected to acquire synchronization with the data region when reading the user data from the data region,
   wherein, when obtaining the user data from the phase-change optical disk, a boundary between the first region and the second region is detected prior to detecting the synchronization mark,
   the synchronization mark is detected in accordance with the position of the detected boundary between the first region and the second region, and
   the user data is obtained from the data region in accordance with the detected synchronization mark.

5. An optical disk apparatus according to claim 4, wherein the second region on the phase-change optical disk is formed by a plurality of small regions, and
   when the boundary between the first region and the second region cannot be detected, a boundary between the plurality of small regions is detected, and the synchronization mark is detected on the basis of the boundary between the plurality of small regions.

6. An optical disk apparatus according to claim 5, wherein, when detecting the synchronization mark, the boundary between the first region and the second region or the boundary between the plurality of small regions is detected, and any one of boundaries among the subsequent small regions is detected.

7. An optical disk apparatus according to claim 5, wherein, of the boundary between the first region and the second region and boundaries among the plurality of small regions, the boundary which is difficult to detect is excluded from detection objects in advance.

* * * * *